US012120802B2

(12) United States Patent
Kim et al.

(10) Patent No.: US 12,120,802 B2
(45) Date of Patent: Oct. 15, 2024

(54) COOKING APPLIANCE

(71) Applicant: LG Electronics Inc., Seoul (KR)

(72) Inventors: Wontae Kim, Seoul (KR); Hyunwoo Jun, Seoul (KR); Jaekyung Yang, Seoul (KR); Sunghun Sim, Seoul (KR); Seongho Son, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/136,593

(22) Filed: Apr. 19, 2023

(65) Prior Publication Data

US 2023/0254951 A1 Aug. 10, 2023

Related U.S. Application Data

(63) Continuation of application No. 16/903,973, filed on Jun. 17, 2020, now Pat. No. 11,665,793.

(30) Foreign Application Priority Data

Feb. 24, 2020 (KR) ........................ 10-2020-0022579

(51) Int. Cl.
*H05B 6/64* (2006.01)
*H05B 3/00* (2006.01)
(Continued)

(52) U.S. Cl.
CPC ........... *H05B 6/647* (2013.01); *H05B 3/0014* (2013.01); *H05B 6/105* (2013.01); *H05B 6/129* (2013.01);
(Continued)

(58) Field of Classification Search
CPC ........ H05B 6/105; H05B 6/12; H05B 6/1218; H05B 6/1245; H05B 6/129; H05B 6/6402;
(Continued)

(56) References Cited

U.S. PATENT DOCUMENTS 3,514,576 A 5/1970 Kenneth et al.
5,177,333 A 1/1993 Ogasawara
(Continued)

FOREIGN PATENT DOCUMENTS

EP 2472185 B1 1/2016
JP H63-281377 11/1988
(Continued)

OTHER PUBLICATIONS

PCT International Search Report and Written Opinion in International Appln. No. PCT/KR2020/004130, dated Nov. 13, 2020, 9 pages.
Extended European Search Report in European Appln. No. 20920980.8, mailed on Feb. 26, 2024, 8 pages.
Office Action in Australian Appln. No. 2020432828, mailed on Jun. 18, 2024, 4 pages.

*Primary Examiner* — Hung D Nguyen
(74) *Attorney, Agent, or Firm* — Fish & Richardson P.C.

(57) ABSTRACT

A cooking appliance includes a housing that defines a cavity therein, a door connected to the housing and configured to open and close the cavity, a microwave (MW) heating module configured to emit microwaves into the cavity, and an induction heating (IH) module configured to emit a magnetic field towards the cavity. The IH module includes a working coil that is configured to generate the magnetic field and a thin film that is disposed between the cavity and the working coil.

20 Claims, 5 Drawing Sheets

(51) Int. Cl.
*H05B 6/10* (2006.01)
*H05B 6/12* (2006.01)
*H05B 6/70* (2006.01)

(52) U.S. Cl.
CPC ......... *H05B 6/6402* (2013.01); *H05B 6/6482* (2013.01); *H05B 6/6488* (2013.01); *H05B 6/707* (2013.01)

(58) Field of Classification Search
CPC .... H05B 6/6411; H05B 6/6414; H05B 6/642; H05B 6/6426; H05B 6/6435; H05B 6/6444; H05B 6/6447; H05B 6/645; H05B 6/647; H05B 6/6473; H05B 6/6476; H05B 6/6479; H05B 6/6482; H05B 6/6485; H05B 6/6488; H05B 6/681; H05B 6/687; H05B 6/707; H05B 6/76; H05B 6/766; H05B 3/0014; H05B 3/0076
USPC ....... 219/600, 601, 620, 622, 624, 625, 634, 219/635, 672, 675, 676, 678, 679–681, 219/685, 728–729, 752–756, 759, 219/762–763
See application file for complete search history.

(56) References Cited

U.S. PATENT DOCUMENTS

| | | | | |
|---|---|---|---|---|
| 6,333,492 | B1 | 12/2001 | Graves et al. | |
| 8,440,948 | B2 * | 5/2013 | Noda | A21B 1/245 219/757 |
| 8,772,686 | B2 | 7/2014 | Louie et al. | |
| 9,629,499 | B2 * | 4/2017 | Kim | A47J 37/00 |
| 9,674,903 | B2 * | 6/2017 | Moon | H05B 6/68 |

FOREIGN PATENT DOCUMENTS

| | | | |
|---|---|---|---|
| JP | 2003-157964 | | 5/2003 |
| JP | 2006207874 A | * | 8/2006 |
| JP | 2007-200752 | | 8/2007 |
| JP | 2008-159337 | | 7/2008 |
| JP | 2013-122933 | | 6/2013 |
| KR | 10-2008-0037796 | | 5/2008 |
| WO | WO 2007/043288 | | 4/2007 |

* cited by examiner

COOKING APPLIANCE

CROSS-REFERENCE TO RELATED APPLICATIONS

This application is a continuation of U.S. application Ser. No. 16/903,973, filed on Jun. 17, 2020, which claims priority under 35 U.S.C. 119 and 365 to Korean Patent Application No. 10-2020-0022579, filed on Feb. 24, 2020, the disclosures of which are incorporated herein by reference in their entirety.

TECHNICAL FIELD

The present disclosure relates to a cooking appliance.

BACKGROUND

Various types of cooking appliances are used to heat food at home or in restaurants. For example, various cooking appliances may include a microwave oven, an induction heating type electric stove, and a grill heater.

The microwave oven may use electromagnetic radiation in a microwave frequency range to vibrate molecules in food to thereby generate heat to quickly heat food.

The induction heating type electric stove may heat an object to be heated by using electromagnetic induction. Specifically, the induction heating type electric stove may generate eddy current in an object made of a metal component by using a magnetic field generated around a coil by a high frequency power of a predetermined magnitude. The object may be heated by the eddy current.

The grill heater may heat food by radiation or convection of infrared heat as the infrared heat passes through the food.

As the number and types of cooking appliances increase, the cooking appliances may occupy a large area in the living space. Thus, in some cases, a multi-purpose cooking appliance may include a plurality of heating modules. In some cases, a cooking appliance may a plurality of heating methods simultaneously to cook food. For example, a cooking appliance may simultaneously use a microwave and an induction heating coil heat source.

In some cases, a user may place a separate conductor tray for heating the induction heating coil by the microwave. In some cases, it may not be possible to heat a type of vessel (for example, a nonmagnetic vessel) in addition to a separate conductor tray with an induction heating coil heat source.

In some cases, a cooking appliance may have a complex structure, which may increase the manufacturing cost. For example, the cooking appliance may include a separate sensor part for determining whether the conductor tray is mounted thereon because, when the conductor tray is not mounted, the microwave and the induction heating coil heat source may not be used at the same time.

SUMMARY

The present disclosure describes a composite cooking appliance having a plurality of heat sources.

For example, the present disclosure describes a cooking appliance having a microwave (MW) heating module and an induction heating (IH) module together. In some examples, the MW heating module and the IH module may simultaneously heat an object to be heated.

The present disclosure also describes a cooking appliance for heating the object by operating the MW heating module and the IH module simultaneously regardless of the material of the object.

According to one aspect of the subject matter described in this application, a cooking appliance includes a housing that defines a cavity therein, a door connected to the housing and configured to open and close the cavity, a microwave (MW) heating module configured to emit microwaves into the cavity, and an induction heating (IH) module configured to emit a magnetic field towards the cavity. The IH module includes a working coil that is configured to generate the magnetic field and a thin film that is disposed between the cavity and the working coil.

Implementations according to this aspect may include one or more of the following features. For example, the housing may include a plate that defines the cavity, the plate having at least a portion in contact with the thin film. The thin film may be coated on an entire upper surface of the plate or an entire lower surface of the plate. In some examples, the thin film may be in contact with a portion of an upper surface of the plate or a portion of a lower surface of the plate, where the plate may define a plurality of holes. In some examples, the plurality of holes may be defined in a region of the plate in contact with the thin film. In some examples, none of the plurality of holes is defined in a region of the plate outside of the thin film.

In some implementations, the IH module further may include a cover that covers the thin film. For example, the thin film may cover the upper surface of the plate. In some examples, the thin film may cover the lower surface of the plate.

In some implementations, the plate may include a first plate made of a glass material and covered by the thin film, and a second plate made of an iron material. In some examples, the first plate may be disposed laterally inside the second plate. In some examples, the second plate may be flush with the first plate.

In some implementations, the IH module further may include a heat insulating material disposed between the working coil and the thin film. In some examples, the MW heating module may include a magnetron configured to generate the microwaves, and a waveguide configured to guide the microwaves to the cavity.

In some implementations, the IH module may be configured to provide the magnetic field to a first surface defining the cavity, and the MW heating module may be configured to supply the microwaves to the cavity through a second surface defining the cavity. In some examples, the first surface may be a bottom surface facing the cavity, and the second surface may be at least one of surfaces other than the bottom surface.

In some implementations, the cooking appliance may further include a grill heater configured to supply radiant heat to the cavity through a third surface defining the cavity. In some implementations, a skin depth of the thin film may be greater than a thickness of the thin film.

According to another aspect, a cooking appliance includes a housing that defines a cavity configured to receive an object, a magnetron that is configured to generate microwaves and that is configured to heat the object by the microwaves, a waveguide configured to guide the microwaves to the cavity, a working coil that is configured to generate a magnetic field and that is configured to, based on the object being a magnetic object, heat the object by induction, and a thin film that is disposed between the cavity and the working coil and that is configured to, based on the object being a nonmagnetic object, induce current by the working coil to thereby heat the object.

Implementations according to this aspect may include one or more of the following features or the features described above. For instance, the waveguide may be configured to guide the magnetic field to an upper portion of the cavity, and the thin film may be disposed vertically below the cavity, and the working coil is disposed vertically below the thin film.

In some implementations, where the thin film of the cooking appliance passes through the magnetic field generated by the working coil and blocks the microwaves, the MW heating module and the IH module may be driven simultaneously.

In some implementations, the IH module may heat both the magnetic body and the nonmagnetic body through a thin film, and thus the IH module can heat the object regardless of the disposition position and the type of the object. In some examples, the cooking applicant may not include a sensor for detecting a separate tray, a sensor for detecting the material of the object, or the like.

In addition to the above-described effects, additional effects of the present disclosure will be described together with the following detailed description.

DETAILED DESCRIPTION

Figure 1:
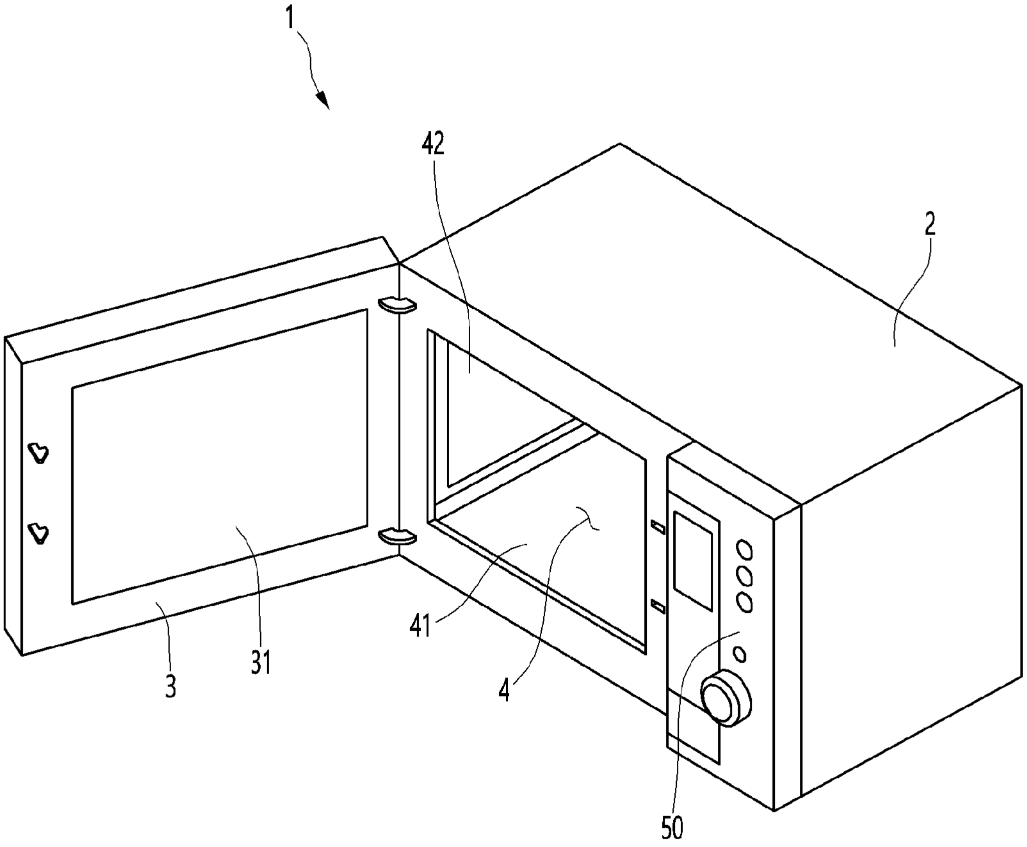
FIG. 1 is a perspective view illustrating an example of a cooking appliance.

Hereinafter, exemplary implementations of the present disclosure will be described in detail with reference to the accompanying drawings. In the drawings, the same reference numerals are used to indicate the same or similar components.

Hereinafter, one or more examples of a cooking appliance will be described.

FIG. 1 is a perspective view illustrating an example of a cooking appliance.

The cooking appliance 1 may include a housing 2 and a door 3 connected to the housing 2.

A cavity 4 may be defined in the housing 2, and the cavity 4 may be a cooking chamber. The cavity 4 may be a cooking space configured to receive an object to be heated.

In some implementations, an input interface 50 may be disposed on an outer surface of the housing 2. The input interface 50 may receive an input for operating the cooking appliance from the user.

The cavity 4 can be opened or closed by the door 3. The door 3 may be attached to the front portion of the housing 2 so that the door can be opened and closed. The door 3 can open and close the cavity 4. A window 31 may be formed in the door 3. The user can check the inside of the cavity 4 through the window 31 when the cavity 4 is closed. The window 31 will be described in detail with reference to FIG. 3.

The cavity 4 may be formed with first to fifth surfaces and may be opened or closed according to the position of the door 3. A first surface of the cavity 4 is a bottom surface 41, a second surface thereof is a ceiling surface 43 (see FIG. 3), a third surface thereof is a rear surface 45 (see FIG. 3), a fourth surface and a fifth face may be both side surfaces. Both side surfaces may be in contact with the bottom surface 41, the ceiling surface 43, and the rear surface 45, respectively. One of both side surfaces 42 may be formed close to the door 3 and the other may be formed close to the input interface 50.

Figure 2:
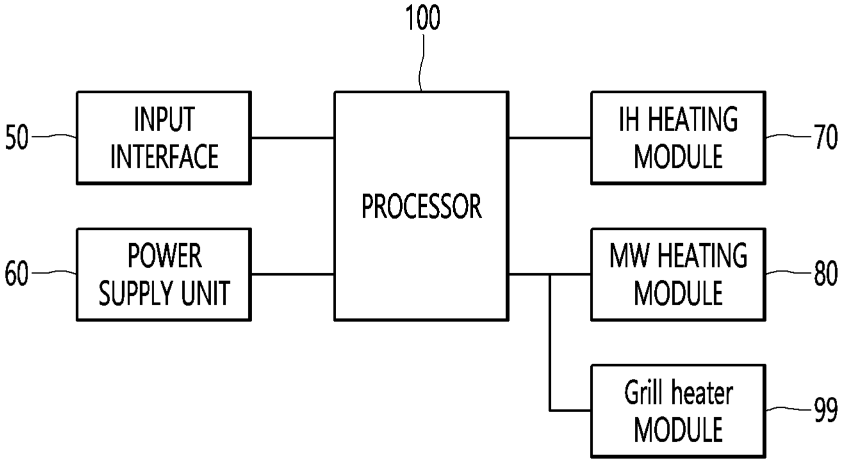
FIG. 2 is a control block diagram illustrating an example of a cooking appliance.

FIG. 2 is a control block diagram illustrating an example of a cooking appliance.

The cooking appliance 1 may include an input interface 50, a power supply unit 60, an IH module 70, a MW heating module 80, and a processor 100. FIG. 2 is an example for convenience of description, and the cooking appliance 1 may further include other components in addition to the components illustrated in FIG. 2 or may omit some of the components illustrated in FIG. 2.

The processor 100 may control the overall operation of the cooking appliance 1. The processor 100 may control each of the input interface 50, the power supply unit 60, the IH module 70, and the MW heating module 80. The processor 100 may control the IH module 70 and the MW heating module 80 so as to operate the cooking appliance 1 according to the input received through the input interface 50. For example, the processor 100 may include an electric circuit, an integrated circuit, a controller, or the like.

The input interface 50 may receive various inputs to operate the cooking appliance 1. For example, the input interface 50 may receive an operation start input or an operation stop input of the cooking appliance 1. In some examples, the input interface 50 may receive an input for driving the IH module 70 or input for driving the MW heating module 80. In some examples, the input interface 50 may include a button, a dial, a touch pad, a knob, a switch, or the like.

The power supply unit 60 may receive power from an external power source for operation of the cooking appliance 1. The power supply unit 60 may supply power to the input interface 50, the IH module 70, the MW heating module 80, the processor 100, and the like. In some examples, the power supply unit 60 may be a commercial power supply, an electric circuit, a regulator, a rectifier, or the like.

The IH module 70 may provide the heat source of the induction heating method to the cavity 4. The IH module 70 may emit a magnetic field towards the cavity 4.

The IH module 70 may generate a magnetic field through the working coil to directly or indirectly heat an object to be heated in the cavity 4.

Specifically, the IH module 70 may include at least some or all of the working coil, the thin film, the cover, the heat insulating material, and the ferrite. In some implementations, the IH module 70 may further include an inverter or the like, but for the convenience of description, a detailed description thereof will be omitted.

The working coil can generate a magnetic field. The working coil may directly heat an object (that is, a magnetic body) that is magnetic, and indirectly heat an object (that is, a nonmagnetic body) that is not magnetic through the thin film.

The working coil may heat an object by an induction heating method, and the working coil may be provided to overlap the thin film in a longitudinal direction (that is, a vertical direction or an up and down direction).

The thin film passes through a magnetic field generated in the working coil and may not pass the microwave generated in the MW heating module 80.

The thin film may have a skin depth deeper than the thickness of the thin film. The thin film may shield the microwaves. The thin film may heat a nonmagnetic body of an object.

The thin film may be disposed between the cavity 4 and the working coil. Between the cavity 4 and the working coil, a thin film, a heat insulating material, and the like may be further disposed.

The thin film may be disposed to be in contact with a plate forming one surface of the cavity 4. The thin film may be coated on a cover to be described later.

The thin film may be provided to overlap the working coil in the longitudinal direction (that is, in the vertical direction or the up and down direction), thereby being capable of heating the object regardless of the disposition position and type of the object.

In addition, the thin film may have at least one property of magnetic and nonmagnetic (that is, magnetic, nonmagnetic, or both magnetic and nonmagnetic).

In addition, the thin film may be formed of, for example, a conductive material (for example, aluminum) and may be formed in a shape in which a plurality of rings having different diameters from each other are repeated, but is not limited thereto. In other words, the shape, size, or the like of the thin film may vary.

The thin film may be made of a material other than the conductive material or may be formed in another shape. However, for convenience of description, it will be described on the assumption that the thin film is made of a conductive material in an implementation of the present invention.

The thin film can be coated on the cover.

The cover may cover the thin film. The cover may protect the thin film from the outside.

Specifically, when an object is directly placed on the thin film, or when food in the object overflows into the thin film, the thin film may be worn or contaminated. Thus, the cover may cover the thin film so that the thin film is protected from these problems.

The cover may be formed of a nonmetallic component so that the magnetic field can pass through the cover. The cover may be composed of a glass material (for example. ceramic glass).

The cover may be formed of a component having heat resistance to the heat of the object, the heat of the thin film, and the like. In particular, the thin film may be heated to a temperature close to about 600 degrees and may be formed of a material which can withstand such high temperatures.

The cover can dissipate the heat of the thin film. The cover may diffuse heat while hot heat generated in the thin film is transferred to the cover.

A heat insulating material may be disposed between the thin film and the working coil. The heat insulating material can be mounted on an upper portion of the working coil. The heat insulating material may block the generated heat from being transferred to the working coil while the thin film or the object is heated by the driving of the working coil.

In other words, when the thin film or the object is heated by electromagnetic induction of the working coil, heat of the thin film or the object is transferred to the cover or the plate, and the heat of the cover or the plate is transferred to the working coil again to damage the working coil. By blocking the heat from being transferred to the working coil in this way, the heat insulating material can prevent the damage of the working coil by heat, and furthermore, the heating performance of the working coil can be prevented from being lowered.

The ferrite may be mounted below the working coil to block a magnetic field generated downward when the working coil is driven.

The MW heating module 80 may provide microwaves to the cavity 4. The MW heating module 80 may emit microwaves into the cavity 4.

The MW heating module 80 may include a magnetron positioned outside the cavity 4 in the housing 2 to generate microwaves, and a waveguide for guiding microwaves generated from the magnetron to the cavity 4.

In some implementations, as shown in FIG. 2, the cooking appliance 1 may include only the IH module 70 and the MW heating module 80. In some implementations, the cooking appliance 1 may further include a grill heater module (99) or device.

The grill heater module (99) may supply radiant heat so as to heat food received in the cavity 4. The grill heater module (99) may include a heating unit having an infrared heating wire and allow to generate radiation or convection of the infrared heat generated from the heating unit to the cavity 4.

For instance, in some implementations, the cooking appliance 1 may include an IH module 70, a MW heating module 80, and a grill heater module (99), and the IH module 70 may emit a magnetic field towards the first surface of the cavity 4, the MW heating module 80 may supply microwaves to the cavity 4 through the second surface of the cavity 4, and a grill heater module (99) may supply radiant heat to the cavity 4 through the third surface of the cavity 4.

Hereinafter, a case where the cooking appliance 1 includes the IH module 70 and the MW heating module 80 will be described.

Figure 3:
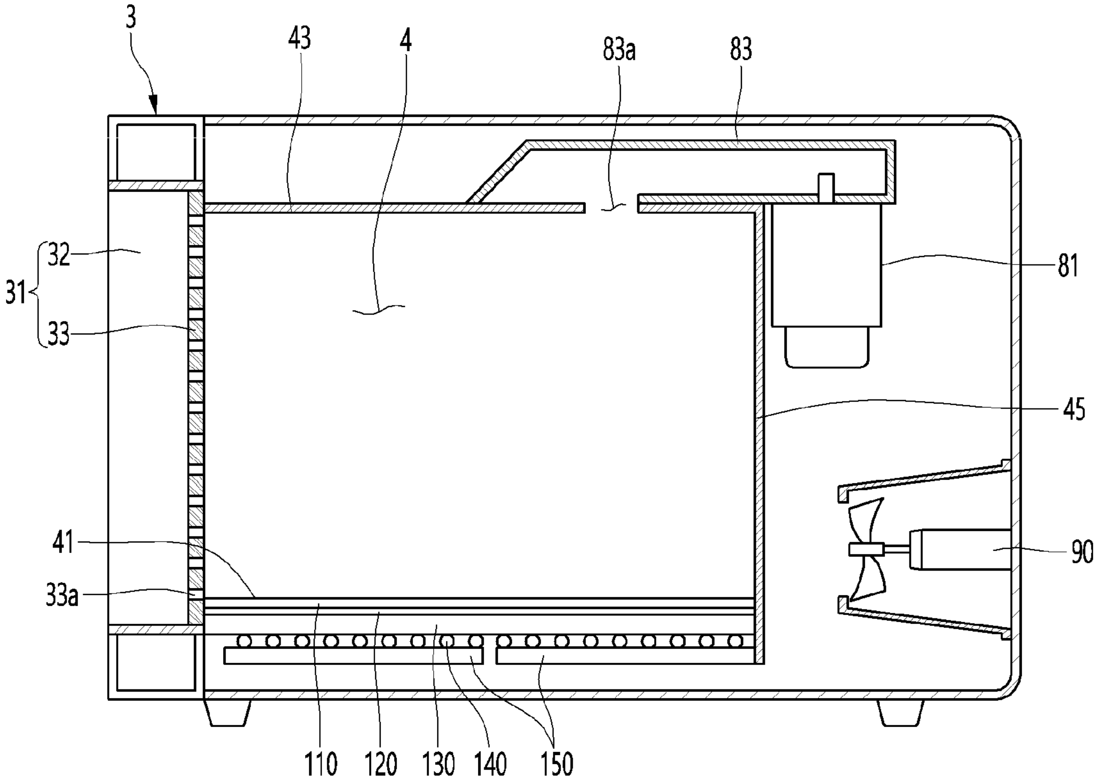
FIG. 3 is a sectional view illustrating an example of a cooking appliance.

FIG. 3 is a sectional view illustrating an example of a cooking appliance.

The door 3 can open and close the cavity 4. A window 31 may be formed in the door 3, and the window 31 may include a window unit 32 and a shielding unit 33.

The window unit 32 may be formed of a transparent material or a translucent material. The user can see inside the cavity 4 through the window unit 32. The outer surface of the window unit 32 may face the outside of the cooking appliance 1, and the inner surface of the window unit 32 may face the inside of the cooking appliance 1.

The shielding unit 33 may be mounted on the inner surface of the window unit 32. The shielding unit 33 may block the microwaves of the cavity 4 from moving out of the cooking appliance 1 through the door 3.

The shielding unit 33 may be an iron net. A plurality of shielding holes 33*a* may be formed in the shielding unit 33, and the shielding holes 33*a* may have a size larger than that of a wavelength of visible light and smaller than that of a wavelength of microwaves. Therefore, the user can see the inside of the cavity 4 through the shielding hole 33*a*, and microwaves do not pass through the shielding hole 33*a*.

The housing 2 may be provided with a plate 110 that has a first surface (for example, bottom surface 41) facing the cavity 4, and at least one of the plate 110 is in contact with the thin film 120. The IH module 70 may emit a magnetic field towards the first surface of the cavity 4. The first surface may define or face a bottom portion of the cavity 4.

In some implementations, the thin film 120 may be coated on the entire upper surface of the plate 110 or the entire lower surface of the plate 110. In FIG. 3, it is assumed that the thin film 120 is coated on the entire lower surface of the plate 110, but since this is only an example for convenience of description, the coating of the thin film is not limited thereto.

In some examples, the plate 110 may be made of a nonmetallic component so that the magnetic field passes through the plate. The plate 110 may be made of a glass material (for example, ceramic glass). In some implementations, the plate 110 may be a cover that covers the thin film while forming the first surface 41 of the cavity 4. Therefore, in some cases, the plate 110 may have characteristics equivalent to those of the cover.

In addition, the horizontal sectional area size of the thin film 120 may be the same as the horizontal sectional area size of the plate 110. Therefore, the first surface of the cavity 4 may block the movement of the microwave by the thin film 120.

The heat insulating material 130 may be disposed below the thin film 120, the working coil 140 may be disposed below the heat insulating material 130, and the ferrite 150 may be disposed below the working coil 140.

The working coil 140 generates a magnetic field during driving, and when an object made of a magnetic body is placed in the cavity 4, the magnetic field may induce eddy current through the thin film 120 to the object. When an object made of a nonmagnetic body is placed in the cavity 4, the magnetic field generated by the working coil 140 induces eddy current in the thin film 120, and then the plate 110 may heat the object by heat generated in the thin film 120 and diffused into the plate 110.

The characteristics and configuration of the thin film will be described in more detail.

Figure 4:
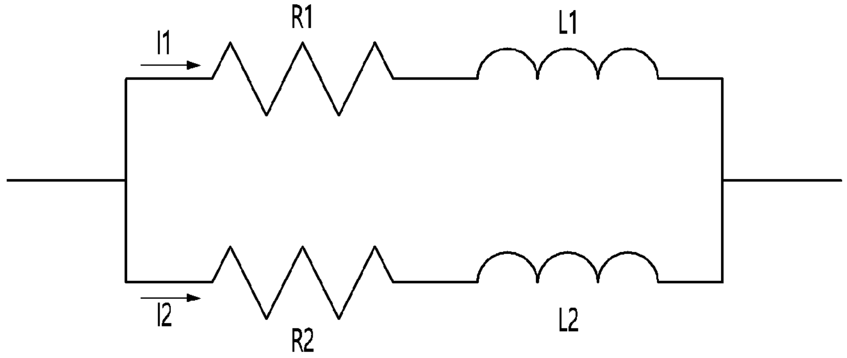
FIGS. 4 and 5 are views illustrating examples of equivalent circuits formed by one or both of an example thin film and an example object to explain a change in electrical impedance according to a type of the object.
Figure 5:
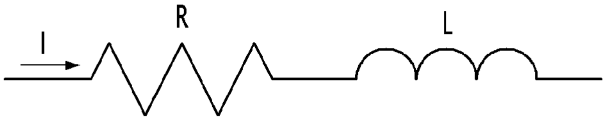

FIGS. 4 and 5 are views illustrating examples of equivalent circuits formed by one or both of an example thin film and an example object to explain a change in electrical impedance according to a type of the object.

For example, the thin film may be made of a material having low relative permeability.

Specifically, when the relative permeability of the thin film is low, the skin depth of the thin film may be deep. Here, the skin depth means the current penetration depth from the material surface, and the relative permeability may be inversely related to the skin depth. Accordingly, the lower the permeability of the thin film, the deeper the skin depth of the thin film.

In some implementations, the skin depth of the thin film may be deeper than the thickness of the thin film. For example, where the thin film has a thin thickness (for example, 0.1 μm~1,000 μm thickness) and the skin depth of the thin film is deeper than the thickness of the thin film, the magnetic field generated by the working coil may pass through the thin film to transfer to the object, and thus the eddy current can be induced in the object.

In some cases, when the skin depth of the thin film is shallower than the thickness of the thin film, it may be difficult for the magnetic field generated by the working coil to reach the object.

In other cases, when the skin depth of the thin film is deeper than the thickness of the thin film, the magnetic field generated by the working coil may reach the object. In other words, in the implementation of the present disclosure, since the skin depth of the thin film is deeper than the thickness of the thin film, the magnetic field generated by the working coil passes through the thin film and is mostly transferred to the object and exhausted, and thus the object can be primarily heated.

In some examples, where the thin film has a thin thickness as described above, the thin film may have a resistance value to be heated by the working coil.

Specifically, the thickness of the thin film may be inversely related to the resistance value (that is, the surface resistance value) of the thin film. For example, as the thickness of the thin film becomes thinner, the resistance value (that is, the surface resistance value) of the thin film becomes larger. The thin film may be thinly coated to change characteristics into a load that can be heated by current.

For example, the thin film may have a thickness from 0.1 μm to 1,000 μm, but the thickness of the thin film is not limited thereto.

Since the thin film having such characteristics exists to heat the nonmagnetic material, the impedance characteristics between the thin film and the object may be changed according to whether the object disposed in the cavity 4 is a magnetic body or a nonmagnetic body.

An example case, where the object is a magnetic body, is described as follows.

When the object which is magnetic is placed in the cavity 4 and the working coil is driven, the resistance component R1 and the inductor component L1 of the object which is magnetic as illustrated in FIG. 4 can form an equivalent circuit together with the resistance component R2 and the inductor component L2 of the thin film.

In this case, the impedance (that is, impedance composed of R1 and L1) of the object which is magnetic in the equivalent circuit may be smaller than the impedance of the thin film (that is, impedance composed of R2 and L2).

Accordingly, when the equivalent circuit as described above is formed, the size of the eddy current I1 applied to the object which is magnetic may be larger than the size of the eddy current I2 applied to the thin film. Accordingly, most of the eddy current generated by the working coil is applied to the object, so that the object can be heated.

In other words, when the object is a magnetic body, since the above-described equivalent circuit is formed and most of the eddy currents are applied to the object, the working coil can directly heat the object.

In some examples, where some eddy current is also applied to the thin film so that the thin film is slightly heated, the object may be slightly indirectly heated by the thin film. In some cases, the degree to which the object is indirectly heated by the thin film is not significant as compared with the degree to which the object by the working coil is directly heated.

An example case, where the object is a nonmagnetic body, is described as follows.

When an object, which is not magnetic, is disposed in the cavity 4 and the working coil is driven, an impedance may not exist in the object which is not magnetic and impedance may exist in the thin film. In other words, the resistance component R and the inductor component L may exist only in the thin film.

Therefore, when an object to be heated which is not magnetic is disposed in the cavity 4 and the working coil is driven, as illustrated in FIG. 5, the resistance component R and the inductor component L of the thin film can form an equivalent circuit.

Accordingly, the eddy current I may be applied only to the thin film, and the eddy current may not be applied to the object which is not magnetic. More specifically, the eddy current I generated by the working coil is applied only to the thin film so that the thin film can be heated.

In some examples, when the object is a nonmagnetic body since the eddy current I is applied to the thin film and the thin film is heated, the object may be indirectly heated by the thin film heated by the working coil.

As discussed above, regardless of whether the object is a magnetic body or a nonmagnetic body, the object may be directly or indirectly heated by one heat source referred to as a working coil. For example, when the object is a magnetic body, the working coil directly heats the object, and when the object is a nonmagnetic body, the thin film heated by the working coil may indirectly heat the object.

The thin film 120, 220, 320, and 420 according to various implementations of the present disclosure to be described below may have the above-described characteristics.

As described above, since the IH module 70 of the cooking appliance 1 may heat both magnetic body and nonmagnetic body, regardless of the disposition position and type of the object, the object can be heated. Accordingly, since the user may place the object on any heating region on the cavity 4 without having to grasp whether the object is a magnetic body or a nonmagnetic body, ease of use can be improved.

In some implementations, the cooking appliance 1 may include the MW heating module 80 and the IH module 70 to heat the object placed on the cavity 4 together.

The MW heating module 80 may be installed close to any one of the second to fifth surfaces of the cavity 4. For example, the MW heating module 80 may supply microwaves to the cavity 4 through the second surface of the cavity 4, where the second surface may be the ceiling surface 43, which is only exemplary. In other words, the second surface may be at least one of the other surfaces except for the surface from which the magnetic field is emitted by the IH module 70. Hereinafter, it is assumed that the second surface is the ceiling surface 43.

The MW heating module 80 may include a magnetron 81, a waveguide 83, and a cooling fan 90, and the waveguide 83 may have one side connected to the magnetron 81 and the other side connected to the cavity 4. At least one slot 83*a* through which microwaves pass may be formed on the ceiling surface 43 of the cavity 4. The cooling fan 90 may be installed around the magnetron 81 to cool the magnetron 81.

The object and the food placed in the cavity 4 may be heated by the IH module 70 and the MW heating module 80.

Figure 6:
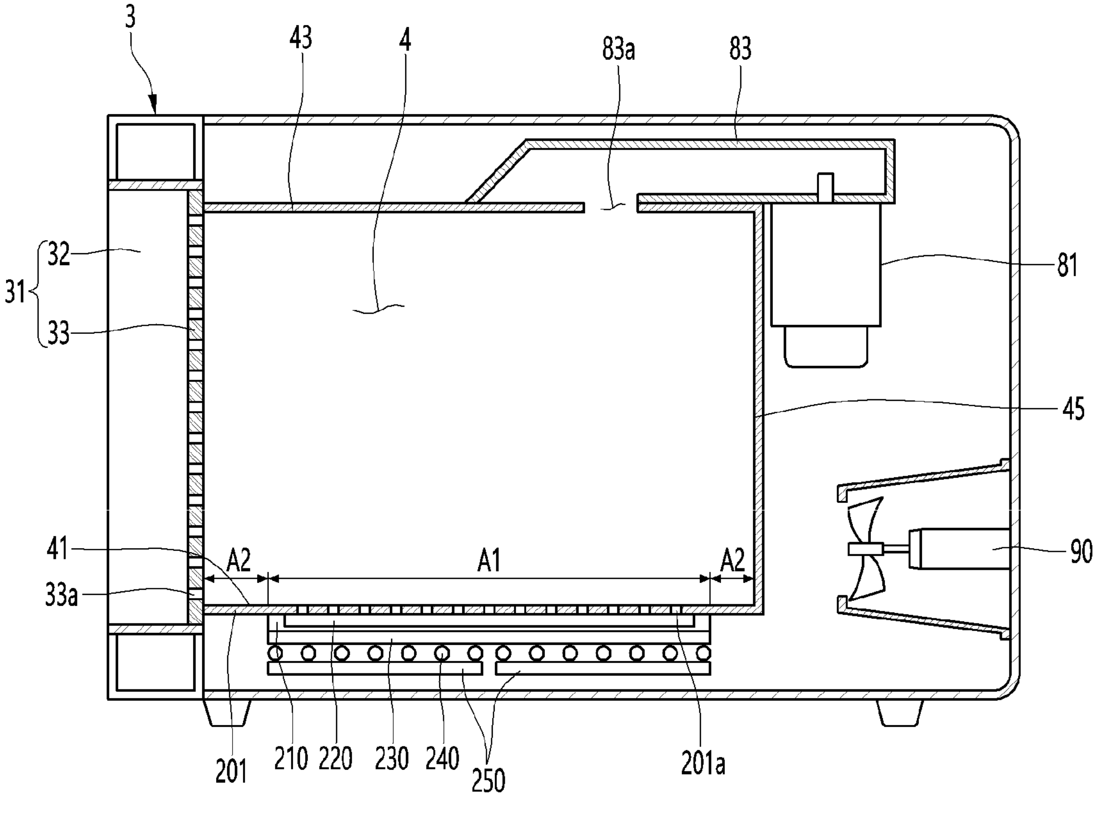
FIG. 6 is a sectional view illustrating an example of a cooking appliance.
Figure 7:
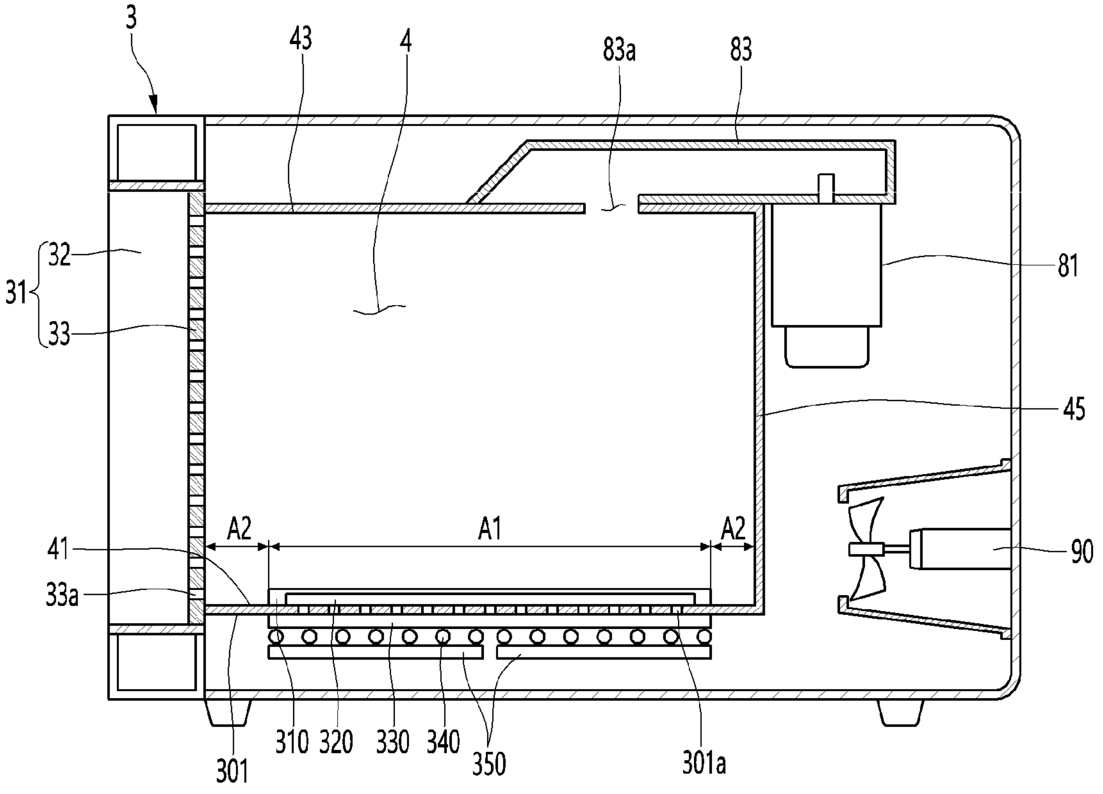
FIG. 7 is a sectional view illustrating an example of a cooking appliance.

FIGS. 6 and 7 are sectional views illustrating examples of a cooking appliance.

Since the characteristics of the door 3, the thin film, the MW heating module 80, and the like except for the structure and the shape of the first surface 41 of the cavity 4 and the IH module 70 are same as described with reference to the first implementation, duplicate descriptions will be omitted. In other words, since the method in which the magnetic field generated by the working coil 240 or 340 heats the object is the same as described in the first implementation, duplicate descriptions will be omitted. In addition, since the heat insulating material 230 or 330, and the ferrite 250 or 350 are the same as described in the first implementation, duplicate descriptions will be omitted.

Referring to FIGS. 6 and 7, the housing 2 may include a plate that defines a first surface facing the cavity 4 (for example, the bottom surface 41), and at least one of the plate is in contact with the thin film 220 or 320. The IH module 70 may emit a magnetic field towards the first surface 41 of the cavity 4. In this case, the IH module 70 may further include a cover 210 or 310 on which the thin film 220 or 320 are coated. Since the cover is described in detail above, duplicate descriptions will be omitted.

In some implementations, the thin film 220 or 320 may be disposed in contact with a portion of the upper surfaces of the plate 201 or 301 or a portion of the lower surfaces of the plate 201 or 301, and the plate 201 or 301 may be formed with a plurality of holes 201*a* or 301*a*. Specifically, in the second implementation, as illustrated in FIG. 6, the thin film 220 is disposed to be in contact with a portion of the lower surface of the plate 201, and, in the third implementation, as illustrated in FIG. 7, the thin film 320 may be disposed to be in contact with a portion of the upper surface of the plate 201. As such, when the thin film 220 or 320 are disposed to be in contact with the plate 201 or 301, the thin film 220 or 320 may block gaps between the plurality of holes 201*a* or 301*a* and the thin film 220 or 320, and thus the microwaves may be completely blocked from moving toward the working coil 240 or 340 through gaps between the plurality of holes 201*a* or 301*a* and the thin film 220 or 320.

In some examples, the plate 201 or 301 may be made of an iron material so that microwaves are blocked, and the plurality of holes 201*a* or 301*a* can be defined so that the magnetic field generated in the working coil 240 or 340 can move to the cavity 4.

The plurality of holes 201*a* or 301*a* may have a size through which a magnetic field generated by the working coil 240 or 340 can pass. In some cases, where not only a magnetic field but also a microwave pass through the plurality of holes 201*a* or 301*a*, the microwave may heat the working coil 240 or 340. In some examples, the thin film 220 or 320 may be disposed to be in contact with the plate 201 or 301, particularly the region of the plate 201 or 301 in which the plurality of holes 201*a* or 301*a* are formed. Accordingly, the magnetic field generated in the working coil 240 or 340 may move to the cavity 4 through the plurality of holes 201*a* or 301*a* and the thin film 220 or 320, and the microwaves in the cavity 4 may be completely blocked from being moved to a direction of the working coil 240 or 340 by the thin film 220 or 320.

The plurality of holes 201*a* or 301*a* are formed in a region A1 of the plate 201 or 301 overlapping the cover 210 or 310 or the thin film 220 or 320 in the vertical direction, and holes 201*a* or 301*a* may not be formed in a region A2 of the plate 201 or 301 which does not overlap the cover 210 or 310 or the thin film 220 or 320 in the vertical direction.

A region A1 of the plate 201 or 301 overlapping the cover 210 or 310 or the thin film 220 or 320 in the vertical direction may be a heating region in which the object is placed. A region A2 of the plate 201 or 301 which does not overlap the cover 210 or 310 or the thin film 220 or 320 in the vertical direction may be an unheated region. As such, when the plurality of holes 201*a* or 301*a* are formed only in a portion of the plate 201 or 301 since the thin film 220 or 320 need not be disposed until the unheated region, the manufacturing cost can be reduced and the manufacturing process can be reduced by reducing the number of holes 201*a* or 301*a*.

In an implementation, holes may be formed in the unheated region, but in this case, the holes in the unheated region may be formed to have a smaller size than the wavelength of the microwave.

In some implementations, as illustrated in FIG. 6, since the upper surface of the plate 201 is flat, there is an advantage in that the object is easily received.

In some implementations, as illustrated in FIG. 7, since the plurality of holes 301*a* are covered by the thin film 320, and the thin film 320 is covered by the cover 310, there is an advantage that, even if food overflows in the object, the thin film 320, the working coil 340, and the like are securely protected, and the ease of cleaning is secured.

Figure 8:
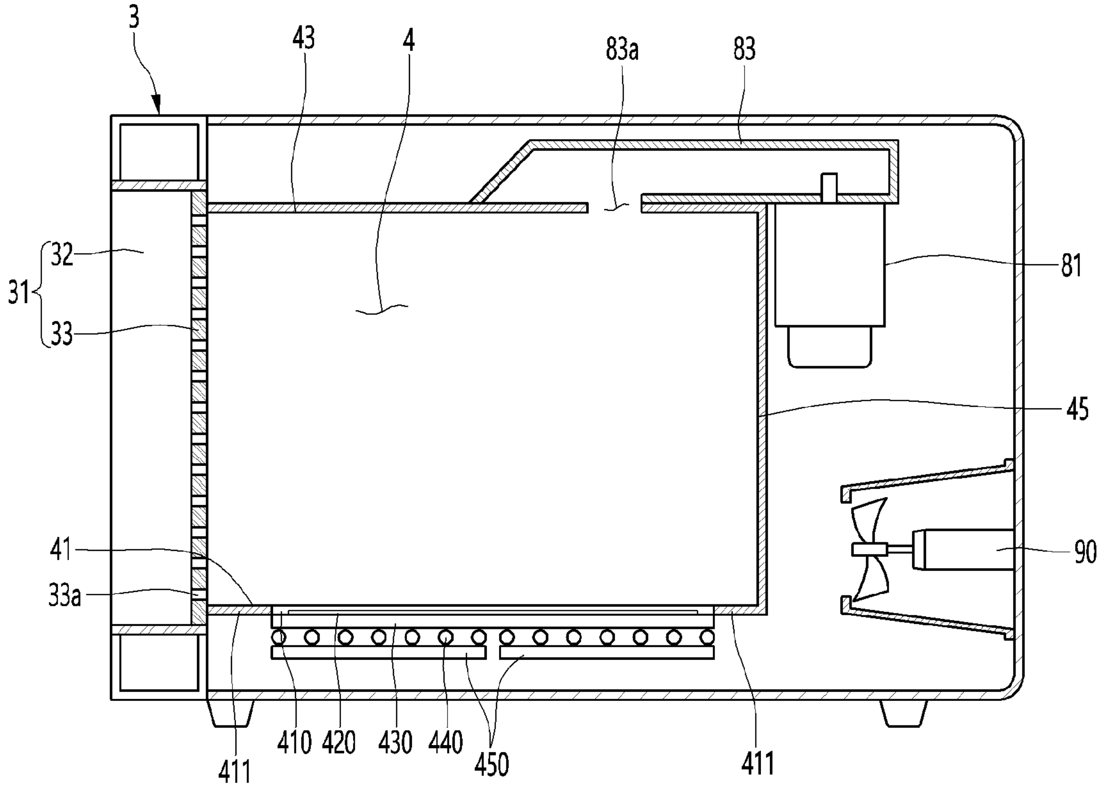
FIG. 8 is a sectional view illustrating an example of a cooking appliance.

FIG. 8 is a sectional view illustrating an example of a cooking appliance.

Similarly, since, except for the structure, the shape, or the like of the first surface 41 of the cavity 4 and the IH module 70, the characteristics of the door 3, the thin film, the MW heating module 80, and the like are the same as described with reference to the first implementation, duplicate descriptions thereof will be omitted. In other words, since the method in which the magnetic field generated by the working coil 440 heats the object or the like is the same as described in the first implementation, duplicate descriptions thereof will be omitted. In addition, since the heat insulating material 430 and the ferrite 450 are the same as described in the first implementation, duplicate descriptions will be omitted.

Referring to FIG. 8, the housing 2 may include plates 410 and 411 that define a first surface of the cavity 4 (for example, the bottom surface 41), and at least a portion of the plates may be in contact with the thin film 420. For example, the plate 410 may be disposed laterally inward relative to the plate 411, be flush with the plate 411, and define the first surface facing the cavity 4.

The plates 410 and 411 may be formed of a first plate 410 made of glass material coated with the thin film 420 and a second plate 411 made of iron material. The IH module 70 may emit a magnetic field towards the first surface 41 of the cavity 4.

The first plate 410 may be disposed inside the second plate 411. The region where the first plate 410 is formed may be a heating region, and the region where the second plate 411 is formed may be an unheated region.

In some examples, the first plate 410 may serve as a cover.

The thin film 420 may be coated on the lower surface of the first plate 410. The horizontal sectional area size of the thin film 420 may be less than or equal to the horizontal sectional area size of the first plate 410.

The first plate 410 may be made of a nonmetallic component such that the magnetic field passes through the cover as described above. The first plate 410 may be made of a glass material (for example, ceramic glass). The first plate 410 may be formed of a component having heat resistance to the heat of the object, the heat of the thin film 420, and the like. The first plate 410 may disperse the heat of the thin film 420.

As described with reference to the first to fourth implementations, the cooking appliance 1 disposes a thin film between the cavity 4 and the working coil 140, 240, 340, or 440, and thus there is an advantage that the IH module 70 and the MW heating module 80 can heat the object or the food together while minimizing the problem of breakage of the IH module 70 due to the microwave. In other words, the thin film is a protective device of the IH module 70 and can heat the object.

In some implementations, the cooking appliance may heat an object regardless of the material, position, or the like of the object, and the user may not use only a predetermined tray. In some examples, the cooking appliance may not include a sensor for sensing the material of the object.

The above description is merely illustrative of the technical idea of the present disclosure, and various modifications and changes may be made thereto by those skilled in the art without departing from the essential characteristics of the present disclosure.

Therefore, the implementations of the present disclosure are not intended to limit the technical spirit of the present disclosure but to illustrate the technical idea of the present disclosure, and the technical spirit of the present disclosure is not limited by these implementations.

The scope of protection of the present disclosure should be interpreted by the appending claims, and all technical ideas within the scope of equivalents should be construed as falling within the scope of the present disclosure.

What is claimed is:

1. A cooking appliance comprising:

a housing that defines a cavity configured to receive an object to be heated;

a door connected to the housing and configured to open and close the cavity;

a working coil that is configured to generate a magnetic field through a first surface of the cavity;

a thin film that is disposed between the cavity and the working coil; and a plate that defines the first surface of the cavity and is in contact with the thin film, the plate being disposed between the cavity and the working coil, wherein the working coil is configured to, by the magnetic field, induce an eddy current to selectively one of the thin film or the object in the cavity to thereby heat the object.

2. The cooking appliance of claim 1, wherein the working coil is configured to:

based on a material of the object being magnetic, inductively heat the object received in the cavity directly, and based on the material of the object being nonmagnetic, inductively heat a nonmagnetic object received in the cavity indirectly by heating directly the thin film.

3. The cooking appliance of claim 1, wherein the plate is disposed to overlap the thin film and the working coil in a vertical direction.

4. The cooking appliance of claim 3, wherein the plate includes an overlap portion that overlaps with the thin film in the vertical direction and defines a plurality of holes.

5. The cooking appliance of claim 4, further including a cover on which the thin film is coated, the cover overlapping the overlap portion in the vertical direction.

6. The cooking appliance of claim 4, wherein the thin film covers an upper surface of the plate or a lower surface of the plate.

7. The cooking appliance of claim 3, wherein the plate comprises:

a first plate coated with the thin film; and a second plate disposed laterally outside the first plate.

8. The cooking appliance of claim 7, wherein the first plate is made of a glass material and the second plate is made of iron material.

9. The cooking appliance of claim 7, wherein the second plate is flush with the first plate.

10. The cooking appliance of claim 1, wherein the thin film coated on at least a portion of the plate.

11. The cooking appliance of claim 10, wherein the thin film is coated on at least one of an upper surface of the plate and a lower surface of the plate.

12. The cooking appliance of claim 1, further comprising a heat insulating material disposed between the working coil and the thin film.

13. The cooking appliance of claim 1, further comprising a ferrite disposed below the working coil.

14. The cooking appliance of claim 1, further comprising:

a magnetron configured to generate microwaves; and a waveguide configured to guide the microwaves to the cavity.

15. The cooking appliance of claim 14, wherein the working coil is configured to provide the magnetic field to the first surface defining the cavity to thereby transfer the magnetic field to the object in a first direction, and wherein the magnetron is configured to supply the microwaves to the cavity through a second surface defining the cavity to thereby transfer the microwaves to the object in a second direction different from the first direction.

16. The cooking appliance of claim 15, wherein the first surface is a bottom surface facing the cavity, and wherein the second surface is at least one of surfaces other than the bottom surface.

17. The cooking appliance of claim 16, wherein the second surface forms at least one slot through which the microwaves pass, the at least one slot arranged to overlap the thin film in a vertical direction, and wherein the magnetron is arranged at a position not overlapping with the thin film in the vertical direction.

18. The cooking appliance of claim 17, further comprising a cooling fan arranged at a position not overlapping with the thin film in the vertical direction.

19. The cooking appliance of claim 15, further comprising a grill heater configured to supply radiant heat to the cavity through a third surface defining the cavity.

20. The cooking appliance of claim 1, further comprising a grill heater having an infrared heating wire configured to generate radiation or convection of infrared heat from the grill heater to the cavity, wherein the grill heater is arranged at a position not overlapping the thin film in a vertical direction.

* * * * *